M. B. CHURCH.
ORNAMENTED GLASS TABLETS.
No. 183,488. Patented Oct. 24, 1876.
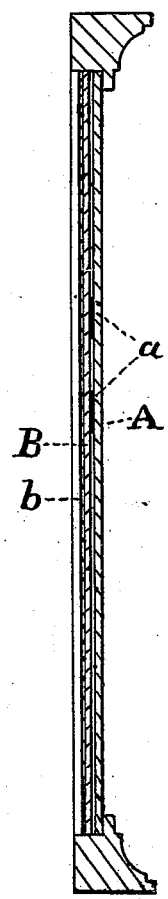
Witnesses:
H. A. Daniels,
Chas L. Coombs.
Inventor:
Melvin B. Church

UNITED STATES PATENT OFFICE.

MELVIN B. CHURCH, OF PHILADELPHIA, PA., ASSIGNOR OF ONE-HALF HIS RIGHT TO GEORGE EASTMAN, OF EASTMANVILLE, MICH.

IMPROVEMENT IN ORNAMENTED GLASS TABLETS.

Specification forming part of Letters Patent No. 183,488, dated October 24, 1876; application filed July 12, 1876.

*To all whom it may concern:*

Be it known that I, MELVIN B. CHURCH, of Philadelphia, in the State of Pennsylvania, have invented certain Improvements in the Ornamenting of Glass, of which the following is a specification:

To enable others to make and use my invention, I will now describe the construction and mode of operation of the same.

The object of my invention is to form an ornamented glass tablet, the same bearing any suitable configuration. It consists in a sheet of transparent glass, having the design on the back side thereof, and secured to the face of a glass mirror. The invention is designed for use as an advertising medium, or for show-cards, &c.

The mirror may be so placed as to correspond with the plane of the ornamented transparent plate, or more than one mirror may be used, the same being placed at such angles as to produce the most striking results.

The front plate of transparent glass may be ornamented in any suitable manner—such, for instance, as gilding with gold-leaf, engraving, painting, &c. The plate is then placed with the ornamented side inward against the face of a mirror. As is obvious, the effect of this arrangement is to give a reflection of a width corresponding to the depth of the glass of which the mirror is formed, and the angle from which the mirrow is viewed. This effect resembles what is known in painting as "shading," and in printing as "blocking."

Figure 1 is a side elevation in section; Fig. 2, a front view of the design, showing the reflection in the mirror which forms the shading.

The front or ornamented plate may be so constructed and arranged as to be removable at will, enabling the operator to replace one design by another, as desired. This may be accomplished by means of suitable conveniences in the frame, or by any other desirable device.

A is the plate of transparent glass; $a$, the engraving, painting, or design thereon; B, the plate of glass, which forms a portion of the mirror; and $b$, the reflecting material.

I am aware that ornamentations of various kinds have before been placed between plates of glass; also, that glass mirrors have been ornamented by application directly upon their front surfaces, and such, broadly, I do not claim; but What I do claim is—

1. The ornamented transparent-glass tablet A $a$, combined with the glass mirror B $b$ as a background, as and for the purpose described.

2. As a new article of manufacture, the glass tablet herein described, consisting of a removable ornamented glass plate, A $a$, combined with the glass mirror B $b$ as a background, substantially as and for the purpose specified.

In testimony that I claim the foregoing as my own I affix my signature in presence of two witnesses.

MELVIN B. CHURCH.

Witnesses:
H. CLAY SMITH,
H. C. ROBINSON.